US Patent
Wilfert et al.

[11] 4,093,255
[45] June 6, 1978

[54] PASSENGER MOTOR VEHICLE

[75] Inventors: Karl Wilfert, Gerlingen-Waldstadt; Walter Schmid, Sindelfingen, both of Germany

[73] Assignee: Daimler-Benz Aktiengesellschaft, Germany

[21] Appl. No.: 572,952

[22] Filed: Apr. 30, 1975

[30] Foreign Application Priority Data
May 2, 1974  Germany .............. 2421207

[51] Int. Cl.² .................................. B62D 27/04
[52] U.S. Cl. ...................... 280/788; 296/28 K
[58] Field of Search .............. 280/104, 106 R, 106 T, 280/124 R, 124 B, 688, 721, 723, 106.5 R; 296/28 R, 28 K, 28 F

[56] References Cited
U.S. PATENT DOCUMENTS

| 2,702,206 | 2/1955 | Barenyi | 296/28 K |
| 2,925,135 | 2/1960 | Hamilton | 296/28 K |
| 3,889,968 | 6/1975 | Wilfert | 296/28 K |

FOREIGN PATENT DOCUMENTS

| 5,176 of | 1883 | United Kingdom | 280/106.5 |
| 186,424 | 9/1922 | United Kingdom | 280/106.5 |

Primary Examiner—Joseph F. Peters, Jr.
Assistant Examiner—John A. Carroll
Attorney, Agent, or Firm—Craig & Antonelli

[57] ABSTRACT

A passenger motor vehicle with a lower portion that includes a front axle and a rear axle non-yieldingly interconnected with each other at least in the vehicle longitudinal direction, and an upper portion separate from the lower portion and including at least the passenger space, which is pivotal with respect to the lower portion at least in relation to an axis of instantaneous rotation extending in the vehicle transverse direction; the upper and lower portions are thereby connected with each other within the area of their axles by way of at least one support which has an elastic yieldingness in at least one direction.

39 Claims, 4 Drawing Figures

PASSENGER MOTOR VEHICLE

The present invention relates to a passenger motor vehicle with a lower portion including a front axle and a rear axle which are non-yieldingly connected with each other at least in the vehicle longitudinal direction, and with an upper portion independent from the lower portion and including at least the passenger space, which is pivotal with respect to the lower portion at least in relation to an axis of instantaneous rotation extending in the vehicle transverse direction and located at the height or above the center of gravity of the upper portion within the vehicle longitudinal center area.

With a passenger motor vehicle of the aforementioned type which has been proposed heretofore, the vehicle upper portion is pivotally supported in the center area by way of a pin starting from the vehicle lower portion whereby the support takes place by way of a Cardan joint or the like whose center point of the joint is located above the center of gravity of the vehicle. With such a solution, the vehicle upper portion is able to pivot freely up to a certain degree in the forward and rearward directions. The pivoting thereby takes place always about a fixed axis of rotation and thus a coupling always exists between the longitudinal movements and the rotary movements about this axis. Accordingly, with this solution, a tilting of the vehicle upper portion opposite to the starting pitching and brake nose-diving can be achieved, however, by reason of the geometric relationship and tie-in, a transmission of vibrations and shocks, thus in particular longitudinal vibrations and longitudinal shocks onto the vehicle upper portion cannot be prevented.

The underlying problems are to be solved according to the present invention to further develop a passenger motor vehicle constructed in such a manner that also such vibrations and shocks are not transmitted to the vehicle body and thus do not become noticeable to the passengers.

This is achieved according to the present invention in that the upper portion and lower portion are connected within the area of the axles respectively by way of at least one support which possesses an elastic yieldingness at least in one direction. It is achieved by this elastic yieldingness of the supports that the movements between upper and lower portion do not take place about a geometrically fixed axis of instantaneous rotation but that instead the axis of instantaneous rotation is changeable as regards its location whereby in addition to the pivotability about the mentioned vehicle cross axis as axis of instantaneous rotation also a translatory longitudinal displaceability is achieved which enables a far-reaching absorption of longitudinal vibrations and longitudinal shocks and therewith contributes significantly to the improvement of the driving comfort. Therebeyond, also the vertical spring behavior is improved by the elasticity and the transfer of vibrations to the vehicle upper portion is damped.

In one embodiment according to the present invention, the support can be formed by a support element extending in the vertical direction and pivotally connected with the upper portion and lower portion, whereby the support element is preferably arranged inclined to a vertical vehicle transverse plane. A matching to the design of the chassis is made possible by the inclination of the support element extending in the upright direction and also by the length thereof which at least essentially precludes a starting pitching and braking nose-diving.

The support element may be connected within the scope of the present invention with the upper and lower portion by way of ball joints and additionally at least one of the ball joints may be mounted at the corresponding vehicle part, i.e., at the upper or lower portion by way of an elastic mounting support. Instead of the ball joints, also Cardan joints may be provided whereby also at least one of the Cardan joints may be connected with the corresponding vehicle portion by way of an elastic mounting support. Both ball-joints as well as Cardan-joints enable in addition to the longitudinally yielding support, pivotal about a vehicle cross axis, of the lower portion with respect to the upper portion, also a transversely yielding support pivotal about a vehicle longitudinal axis of the lower portion and upper portion so that the upper portion is displaceable practically in all directions within a plane approximately parallel to the plane of the road surface and vibrations and shocks acting in this plane are at least far-reachingly absorbed and do not pass over into the upper part.

With a fastening of the support elements by way of ball-joints or Cardan-joints with respect to the vehicle lower portion and with respect to the vehicle upper portion by the interposition of elastic mounting means, an elastic yieldingness practically in all directions can be achieved by way of the elastic mounting means. In order to attain a stable position of the upper portion with respect to the lower portion which will establish itself in dependence of weight forces notwithstanding these elastic yieldingnesses and the pivotabilities achieved by way of the ball-joints or Cardan-joints, two supports may be provided at least within the area of one axle whereby these supports are arranged converging upwardly toward one another preferably in the transverse direction. For purposes of stabilizing the position of the upper and lower portion, support springs or the like may also be provided additionally between these parts independently of the supports.

In another embodiment of the present invention, at least one support pin may be provided as support element taking over the support, which is supported without further yieldingnesses exclusively by way of rubber bearings with respect to the vehicle upper portion and/or the vehicle lower portion.

Within the scope of the present invention, support elements at least yielding in the longitudinal direction thereof may also be additionally provided which are constructed preferably as springs, especially as coil springs. It is also appropriate for support elements constructed in this manner to connect the same with the corresponding vehicle portion by way of elastic mounting means in order to prevent the transmission of torsional forces onto such support elements. Furthermore, another type of pivotal bearing support of such support elements is possible with advantage, for example, as mentioned above by way of ball-joints or Cardan-joints.

A preferred and particularly simple embodiment according to the present invention resides in providing as support a hood-like clamping or tensioning band connected with one vehicle portion and placed over an abutment coordinated to the other vehicle portion. The clamping or tensioning band may be constructed elastically as such or may be retained elastically.

A particularly appropriate embodiment will result if a diaphragm connected with one vehicle portion and stretched over an abutment coordinated in the other vehicle portion is provided as support. For example, an upwardly projecting extension, coordinated to the lower portion, especially to an axle, may be provided thereby as abutment.

A particularly simple construction results if with such a construction the clamping or tensioning band serving as support or the diaphragm serving as support is constructed elastically so that the diaphragm or the clamping or tensioning band is able to assume additional spring properties. For purposes of stabilizing the support of the vehicle portions with respect to one another and/or for providing an aimed-at stiffening in a predetermined movement or pivot direction, the space between the band and especially between the diaphragm and the abutment may be at least partly filled preferably with an elastic material. Similar effects can also be attained by a construction of the diaphragm with differing hardnesses or stiffnesses over its circumference.

Accordingly, it is an object of the present invention to provide a passenger motor vehicle which avoids by simple means the aforementioned shortcomings and drawbacks encountered in the prior art.

Another object of the present invention resides in a passenger motor vehicle which is of simple construction, yet is able to counteract the pitching and nose-diving during starting and braking of the vehicle and at the same time precludes the transmission of longitudinal vibrations and shocks onto the body.

A further object of the present invention resides in a passenger motor vehicle in which vibrations and shocks, particularly longitudinal vibrations and longitudinal shocks are not transmitted onto the vehicle body, thus improving the driving comfort.

Still another object of the present invention resides in a passenger motor vehicle which achieves a far-reaching absorption of longitudinal vibrations and shocks.

A further object of the present invention resides in a passenger motor vehicle which excels by improved driving comfort and spring characteristics.

These and other objects, features and advantages of the present invention will become more apparent from the following description when taken in connection with the accompanying drawings which shows, for purposes of illustration only, several embodiments in accordance with the present invention, and wherein.

Figure 1:
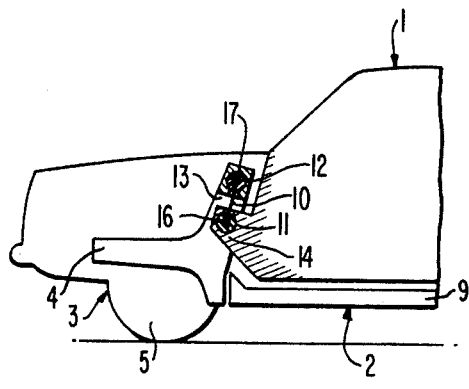
FIG. 1 is a schematic longitudinal, cross-sectional view of the front section of a passenger motor vehicle in accordance with the present invention.
Figure 2:
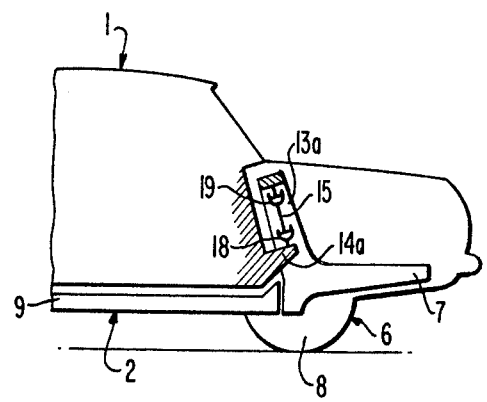
FIG. 2 is a schematic longitudinal, cross-sectional view of the rear section of a passenger motor vehicle in accordance with the present invention.
Figure 3:
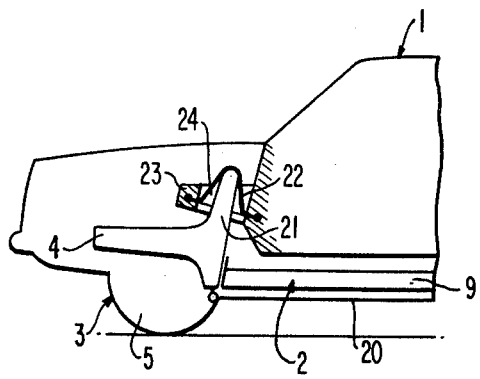
FIG. 3 is a schematic longitudinal, cross-sectional view of the front section of a modified embodiment of a passenger motor vehicle in accordance with the present invention.
Figure 4:
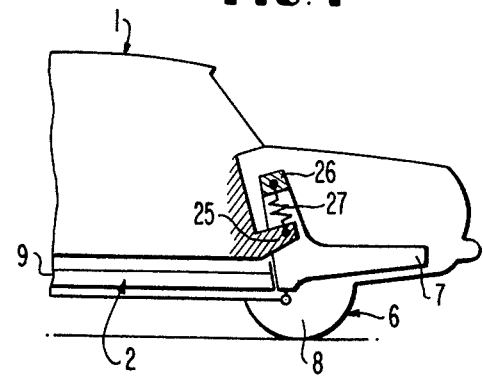
FIG. 4 is a schematic longitudinal cross-sectional view of a still further modified embodiment of the rear section of a passenger motor vehicle in accordance with the present invention.

Referring now to the drawing wherein like reference numerals are used throughout the various views to designate corresponding parts, it is noted that FIGS. 1 and 2 as well as FIGS. 3 and 4 illustrate together in schematic representation a longitudinal cross-section through a passenger motor vehicle whereby the various figures illustrate each a different type of support between the vehicle lower portion and the vehicle upper portion. It is understood, however, that in a given vehicle, the front and rear section may use the same support or may also use different supports chosen from those illustrated herein whereby the supports illustrated for the front sections are equally applicable to the rear sections and vice versa.

Referring now more particularly to the passenger motor vehicle illustrated in longitudinal cross section in FIGS. 1 and 2, of which FIG. 1 illustrates the forward section of the vehicle and FIG. 2 the rearward section of the vehicle, the vehicle includes altogether an upper portion generally designated by reference numeral 1 and a lower portion generally designated by reference numeral 2 whose front axle generally designated by reference numeral 3 includes a front axle member 4 and front wheels 5 and whose rear axle generally designated by reference numeral 6 includes a rear axle member 7 and rear wheels 8. The front axle member 4 and rear axle member 7 are symbolically representative for any suitable, known axle construction and wheel guide systems coordinated thereto. Since they may be of any known, conventional construction, a detailed description thereof is dispensed with herein. The front axle member 4 and the rear axle member 7 are connected with each other by way of a center frame member 9 which precludes horizontal lateral relative movements between the two axles.

FIG. 1 now illustrates a support of the upper portion 1 which includes at least the passenger space but to which may also belong, as illustrated herein, the front and rear body panels; this support includes a support element 10 that is constructed as support pin and is connected by way of ball joints 11 and 12 with the vehicle upper portion 1 and with the vehicle lower portion 2, whereby the connection with the lower portion 2 takes place by way of the ball joint 12 which is supported in an upwardly projecting extension 13 of the front axle member 4. By reason of the fact that the ball joint 12 retained in the extension 13 is located above the ball joint 11, the upper portion 1 is suspendingly guided within the area of the front axle 3. The ball joint 11 is provided within a forwardly projecting extension 14 of the upper portion 1. The extension 13 of the front axle member 4 is preferably constructed bridge-like as viewed in front elevation, though not illustrated herein, so that the extension 14 lies between the legs of the extension 13.

The support element 10 which in the embodiment according to FIG. 1 is constructed as rod or the like that terminates in the ball joints 11 and 12, extends slightly obliquely rearwardly and upwardly, and the position of the axis of instantaneous rotation extending in the vehicle transverse direction, about which the upper portion 1 is pivotal with respect to the lower portion 2, is determined by this inclination of the support element 10 in conjunction with the inclination of the support element 15 coordinated to the rear axle 6. In addition to this pivotability, a translatory displaceability between the upper portion 1 and the lower portion 2 is achieved in that corresponding elastic mounting supports 16 and 17 are coordinated to the ball joints 11 and 12 in the extensions 13 and 14 whereby these mounting supports may be formed by elastic shells, sockets or the like.

A support is illustrated in FIG. 2 which altogether is analogous to the illustration according to FIG. 1, whereby the support is now formed by a support element 15 which is provided between an extension 13a coordinated to the rear axle member 7 and an extension 14a which is coordinated to the upper portion 1 and which extends forwardly. The extension 13a is also located above the extension 14a in FIG. 2. The support element 15 now extends obliquely forwardly and upwardly. The pivotal connection of the support element 15 with respect to the extensions 13a and 14a takes place by way of Cardan joints 18 and 19, of which at least one is elastically mounted at the respective extension in a conventional manner not illustrated in detail. Also in this embodiment, the extension 13a is constructed essentially bridge-shaped as viewed in end elevation so that extension 14a projects between its legs. Furthermore, also in this embodiment, the upper portion 1 is suspendingly supported with respect to the lower portion 2.

Therebeyond, the lower portion 2 may be supported with respect to the upper portion 1 preferably within the area of the rear axle 6 by way of two support elements, not shown in detail herein, which are constructed according to the support element 10 or 15 and which are arranged disposed adjacent one another in the vehicle transverse direction. The arrangement thereby takes place in such a manner that the support elements converge toward one another obliquely upwardly in such a manner that the lines of force intersect in a point. An axis of instantaneous rotation extending in the vehicle longitudinal direction is determined thereby in conjunction with the support element coordinated to the front axle 3, about which the vehicle upper portion 1 is pivotal with respect to the lower portion 2. In addition thereto by reason of the existing elasticities, a translatory displaceability exists also in the cross direction so that both longitudinal as also transverse vibrations as well as longitudinal and transverse shocks are far-reachingly absorbed and do not become noticeable to the passengers present in the upper portion as passenger space.

The vehicle illustrated altogether in longitudinal cross section in FIGS. 3 and 4 corresponds in its overall construction to that of FIGS. 1 and 2 and is provided correspondingly also in this case with an upper portion generally designated by reference numeral 1, with a lower portion generally designated by reference numeral 2, with a front axle generally designated by reference numeral 3 which includes a front axle member 4 and front wheels 5 and with a rear axle generally designated by reference numeral 6 which includes a rear axle member 7 and rear wheels 8. The axle members 4 and 7 are also in this case connected with each other by way of a frame member 9 which permits a torsionability of the axles with respect to one another but precludes a transverse offset or displacement thereof. Therebeyond the axle members 4 and 7 are connected with each other in this embodiment additionally by way of tensional struts 20 forming a diagonal connection which, though not illustrated in detail, are connected with each other at their point of intersection and which are pivotally connected with respect to the front axle member 4 and with respect to the rear axle member 7.

The support of the upper portion 1 with respect to the front axle member 4 takes place in the embodiment according to FIG. 3 by way of a diaphragm 22 extending over an extension 21 provided at the front axle member 4; the diaphragm is thereby anchored in a ring-shaped mounting support 23 surrounding the extension 21 with a spacing and belonging to the upper portion 1 and extends hat-like over the extension 21. The diaphragm 22 is preferably elastically constructed. This elasticity may be different over the circumference of the diaphragm 22, which cannot be seen from the drawing, so that different yieldingnesses result in different directions. A similar effect can also be achieved within the scope of the present invention in that the space 24 between the diaphragm 22 and the extension 21 is filled with an elastic material whereby depending on the hardness of this material different yieldingnesses can be achieved again in different directions. The space 24 may thereby be also filled, for example, with a foamed material. Therebeyond, also a stabilizing of the vehicle upper portion 1 with respect to the lower portion 2 can be achieved by filling the space 24 with foamed material which makes it possible, for example, without or at least essentially without additional supports to connect the upper portion and the lower portion both in front as also in the rear exclusively by way of such a diaphragm support.

The embodiment according to FIG. 4 corresponds far-reachingly to that according to FIG. 2 and the extension coordinated to the vehicle upper portion 1 is designated therein by reference numeral 25 and the extension coordinated to the rear axle member 7 with reference numeral 26. Extensions 25 and 26 are connected by way of a spring, in the illustrated embodiment by way of a coil spring 27 as support element, and this coil spring 27 is elastically retained at least at one end, for example, in the extension 26. This is possible, for example, by a conventional rubber bearing or the like which is not illustrated in detail herein since it is of known construction.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A passenger motor vehicle which comprises a lower portion including front and rear axle means operatively connected with each other and an upper portion independent of the lower portion and including at least the passenger space, the upper portion being pivotal with respect to the lower portion about an axis of instantaneous rotation extending generally in the vehicle transverse direction and disposed within the longitudinal center area of the vehicle at least approximately at the height of the center of gravity of the upper portion, characterized in that the upper portion and lower portion are connected with each other within the area of the axle means by way of at least one support means that possesses an elastic yieldingness in at least one direction, further characterized in that the axis of instantaneous rotation is located above the center of gravity of the upper portion.

2. A passenger motor vehicle according to claim 1, characterized in that the front axle and rear axle means are rigidly connected with each other at least in the vehicle longitudinal direction.

3. A passenger motor vehicle which comprises a lower portion including front and rear axle means operatively connected with each other and an upper portion independent of the lower portion and including at least the passenger space, the upper portion being pivotal with respect to the lower portion about an axis of instantaneous rotation extending generally in the vehicle transverse direction and disposed within the longitudinal center area of the vehicle at least approximately at the height of the center of gravity of the upper portion, characterized in that the upper portion and lower portion are connected with each other within the area of the axle means by way of at least one support means that possesses an elastic yieldingness in at least one direction, further characterized in that the front axle and rear axle means are rigidly connected with each other at least in the vehicle longitudinal direction, and still further characterized in that the support means is formed by a support element extending in the upward direction and pivotally connected with the upper and lower portions.

4. A passenger motor vehicle according to claim 3, characterized in that the support element is arranged inclined with respect to a vertical vehicle transverse plane.

5. A passenger motor vehicle according to claim 4, characterized in that the support element is connected with the upper portion and with the lower portion by way of ball joint means.

6. A passenger motor vehicle according to claim 5, characterized in that at least one of the ball joint means is connected with the corresponding vehicle portion by way of elastic mounting means.

7. A passenger motor vehicle according to claim 4, characterized in that the support element is operatively connected with the upper portion and with the lower portion by way of one Cardan joint means.

8. A passenger motor vehicle according to claim 7, characterized in that at least one of the Cardan joint means is operatively connected with the corresponding vehicle portion by way of an elastic mounting means.

9. A passenger motor vehicle according to claim 4, characterized in that the support element includes a support pin.

10. A passenger motor vehicle according to claim 4, characterized in that the support element is constructed yieldingly at least in its generally longitudinal direction.

11. A passenger motor vehicle according to claim 10, characterized in that an element elastic at least in its longitudinal direction is provided as support element.

12. A passenger motor vehicle according to claim 11, characterized in that a coil spring is provided as support element.

13. A passenger motor vehicle according to claim 12, characterized in that the support element elastic at least in its longitudinal direction, is operatively connected with the corresponding vehicle portion by way of elastic mounting means.

14. A passenger motor vehicle according to claim 13, characterized in that the support element elastic in its longitudinal direction, is pivotally supported at its ends.

15. A passenger motor vehicle according to claim 1, characterized in that a hood-like tension band means connected with one of the vehicle portions and place over an abutment means coordinated to the other vehicle portion is provided as support means.

16. A passenger motor vehicle according to claim 15, characterized in that an upwardly projecting extension is provided as abutment means.

17. A passenger motor vehicle according to claim 16, characterized in that the upwardly projecting extension is coordinated to the lower portion.

18. A passenger motor vehicle according to claim 17, characterized in that the upwardly projecting extension is coordinated to an axle means.

19. A passenger motor vehicle according to claim 18, characterized in that the band means serving as support means is elastically constructed.

20. A passenger motor vehicle according to claim 1, characterized in that a diaphragm means operatively connected with one of the vehicle portions and stretched over an abutment means coordinated to the other vehicle portion is provided as support means.

21. A passenger motor vehicle according to claim 20, characterized in that an upwardly projecting extension is provided as abutment means.

22. A passenger motor vehicle according to claim 21, characterized in that the upwardly projecting extension is coordinated to the lower portion.

23. A passenger motor vehicle according to claim 22, characterized in that the upwardly projecting extension is coordinated to an axle means.

24. A passenger motor vehicle according to claim 23, characterized in that the diaphragm means serving as support means is elastically constructed.

25. A passenger motor vehicle which comprises a lower portion including front and rear axle means operatively connected with each other and an upper portion independent of the lower portion and including at least the passenger space, the upper portion being pivotal with respect to the lower portion about an axis of instantaneous rotation extending generally in the vehicle transverse direction and disposed within the longitudinal center area of the vehicle at least approximately at the height of the center of gravity of the upper portion, characterized in that the upper portion and lower portion are connected with each other within the area of the axle means by way of at least one support means that possesses an elastic yieldingness in at least one direction, and further characterized in that the support means is formed by a support element extending in the upward direction and pivotally connected with the upper and lower portions.

26. A passenger motor vehicle according to claim 25, characterized in that the support element is connected with the upper portion and with the lower portion by way of a ball joint means.

27. A passenger motor vehicle according to claim 26, characterized in that at least one of the ball joint means is connected with the corresponding vehicle portion by way of elastic mounting means.

28. A passenger motor vehicle according to claim 25, characterized in that the support element is operatively connected with the upper portion and with the lower portion by way of one Cardan joint means.

29. A passenger motor vehicle according to claim 28, characterized in that at least one of the Cardan joint means is operatively connected with the corresponding vehicle portion by way of an elastic mounting means.

30. A passenger motor vehicle according to claim 25, characterized in that the support element is constructed yieldingly at least in its generally longitudinal direction.

31. A passenger motor vehicle according to claim 25, characterized in that an element elastic at least in its longitudinal direction is provided as support element.

32. A passenger motor vehicle according to claim 31, characterized in that a coil spring is provided as support element.

33. A passenger motor vehicle according to claim 31, characterized in that the support element elastic at least in its longitudinal direction, is operatively connected with the corresponding vehicle portion by way of elastic mounting means.

34. A passenger motor vehicle according to claim 31, characterized in that the support element elastic in its longitudinal direction, is pivotally supported at its ends.

35. A passenger motor vehicle comprising:
a lower portion including front and rear axle means rigidly connected together at least in the vehicle longitudinal direction,
an upper portion indpendent of the lower portion and including a passenger space,
and support means for supporting said lower portion relative to said upper portion with said upper and lower portions being movable with respect to one another about respective axes extending in the vehicle transverse direction, said axes being spatially movable with respect to one another, wherein said support means exhibits an elastic yieldingness in at least one direction, wherein said at least one direction is the vehicle longitudinal direction, wherein means, and wherein at least some of said axes are disposed above the center of gravity of said upper portion.

36. A passenger motor vehicle according to claim 35, wherein said support means includes a pin extending inclined slightly to the vertical, ball means at each end of said pin, and elastic socket means at respective ones of said upper and lower portions for elastically accommodating said ball means.

37. A passenger motor vehicle according to claim 36, wherein the socket means of said lower portion is disposed above the socket means of said upper portion.

38. A passenger motor vehicle according to claim 36, wherein said support means includes means for suspending said upper portion from a portion of said lower portion.

39. A passenger motor vehicle according to claim 36, wherein said support means are located in the area of the respective axle means.

* * * * *